United States Patent [19]

Simard

[11] 4,183,187
[45] Jan. 15, 1980

[54] CABINET DOOR CONSTRUCTION
[75] Inventor: Houston H. Simard, Louisville, Miss.
[73] Assignee: U.S. Industries, Inc., New York, N.Y.
[21] Appl. No.: 905,175
[22] Filed: May 11, 1978
[51] Int. Cl.² .............................................. E04C 2/38
[52] U.S. Cl. ........................................ 52/475; 52/656; 52/824; 403/402; 403/401; 40/156; 40/152
[58] Field of Search ................ 52/824, 656, 475, 476, 52/586; 403/401, 402, 407; 40/156, 152

[56] References Cited
U.S. PATENT DOCUMENTS

| 111,128 | 1/1871 | Linscott | 403/401 |
|---|---|---|---|
| 3,039,217 | 6/1962 | Stefanakis | 40/152 |
| 3,246,414 | 4/1966 | Buehrer | 40/152 |

FOREIGN PATENT DOCUMENTS 229079  2/1925  United Kingdom ................ 52/475

Primary Examiner—James L. Ridgill, Jr.
Attorney, Agent, or Firm—Clarence A. O'Brien; Harvey B. Jacobson

[57] ABSTRACT

A cabinet door construction wherein a panel is floatingly received in a seat formed in a generally rectangular framework forming a central opening blocked by the panel. A suitable retainer attaches to a front face of the framework for retaining the panel in the seat provided therefor in such a manner that the panel may expand and contract without cracking as humidity conditions and the like vary. The framework includes a plurality of rails arranged in a pair of substantially parallel sets disposed perpendicularly to one another and rigidly secured together by fasteners comprising a pair of parallel legs connected together by a web and driven into the abutting ends of adjacent rails so as to lie substantially in the plane of the framework.

6 Claims, 7 Drawing Figures

U.S. Patent  Jan. 15, 1980  Sheet 1 of 2  4,183,187
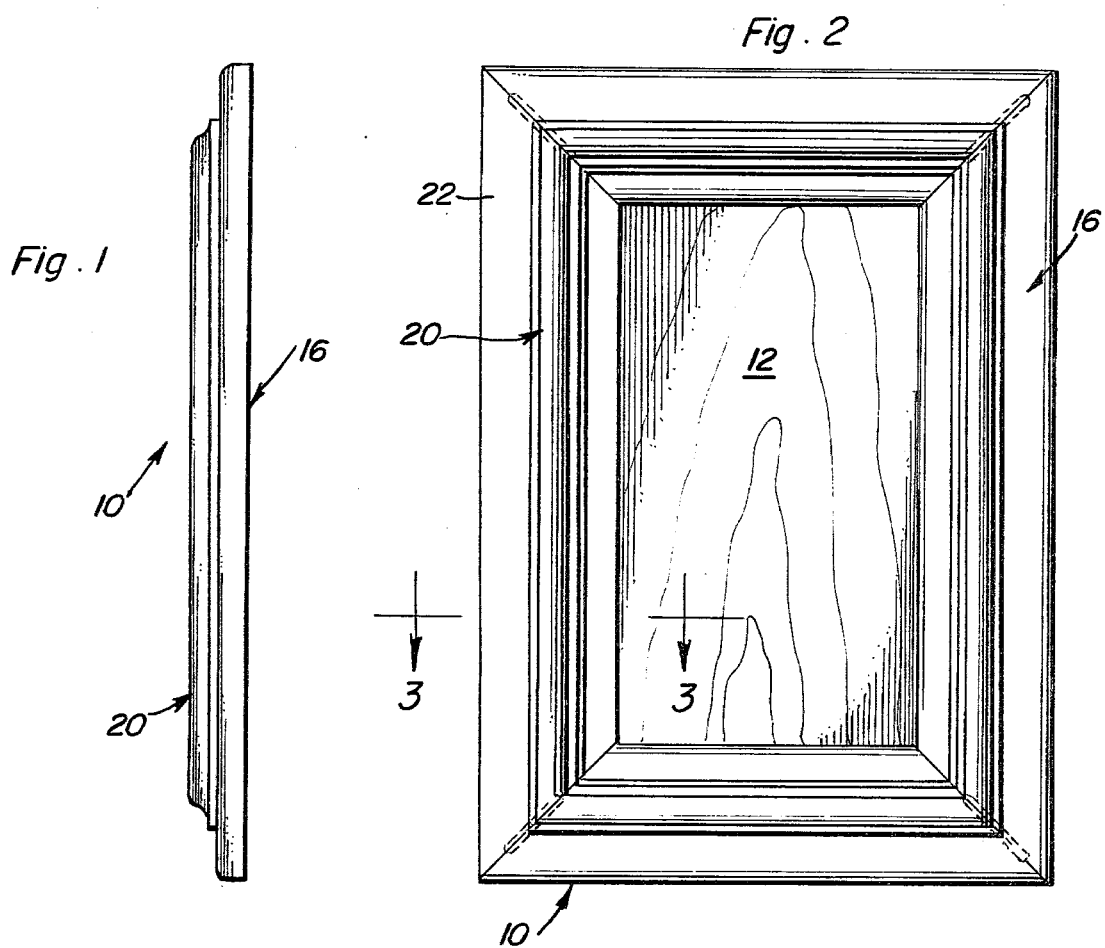
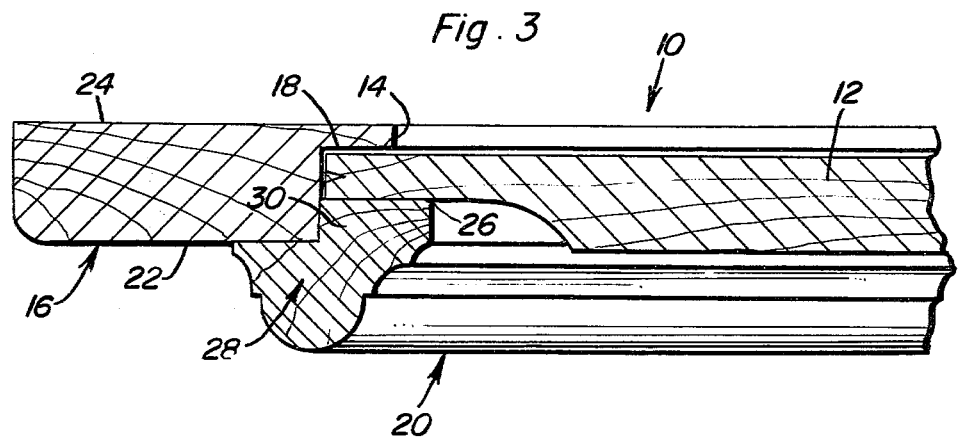

CABINET DOOR CONSTRUCTION

BACKGROUND OF THE INVENTION

1. Field of the Invention

This invention relates generally to the construction of doors, and the like, and particularly to the construction of cabinet doors having panel inserts therein.

2. Description of the Prior Art

It has become increasingly popular to construct doors, and particularly cabinet doors as used in kitchen units, and the like, with panel inserts in order to permit a great number of designs to be employed with a basic door frame. As conventionally constructed, the panels of cabinet doors are secured to the associated framework as by a suitable adhesive, which creates serious problems of cracking of the panel as same expands and contracts relative to the framework due to varying conditions of humidity, and the like.

An example of conventional door construction employing a removable panel can be found in U.S. Pat. No. 2,607,087, issued Aug. 19, 1952, to B. J. Triller. This known construction requires the panel to be inserted into the frame from a side of the door, and also results in drastically reduced design flexibility due to the limitation of a substantially planar panel.

An example of panelling construction in which the panel is rigidly attached to its associated frame can be found in U.S. Pat. No. 2,457,964, issued Jan. 4, 1949, to J. McC. Wyche, while U.S. Pat. No. 1,568,395, issued Jan. 5, 1926, to A. F. Biles, discloses a method of manufacturing wooden panel doors wherein the panel is soaked in linseed oil bath in order to prevent cracking of the panel once installed in a door frame. A disadvantage of this approach, however, is that it is impossible to apply many modern cabinet finishes over wood soaked in linseed oil, and the like.

U.S. Pat. No. 1,635,466, issued July 12, 1927, to J. C. DePenning, discloses a wooden panel door having a panel which floats relative to its associated frame. The panel, however, is retained in the door frame by use of heavy bracing which is impractical for use with cabinet doors, and the like, as it conceals a good part of the panel itself.

SUMMARY OF THE INVENTION

It is an object of the present invention to provide a cabinet door construction which effectively prevents cracking of a panel portion of the door.

It is another object of the present invention to provide a cabinet door construction which permits great flexibility in the choice of designs used on a panel insert partially forming the door.

Still another object of the present invention is to provide a cabinet door construction in which the door is afforded great latitude in design, while simultaneously being rigid and economical of fabrication.

These and other objects are achieved according to the present invention by providing a cabinet door having: a panel; a framework including a seat for floatingly receiving the panel; and a retainer removably mounted on the framework for holding the panel in the seat of the framework. Preferably, the framework has a substantially rectangular configuration, with the panel also having a rectangular configuration and being slightly smaller in size than the seat formed by the framework. The latter has a front face and a rear face, with the seat of the framework including a ledge extending into the opening from adjacent the rear face of the framework for permitting the panel to be placed in and removed from the seat from adjacent the front face of the framework.

The retainer advantageously includes a molding of substantially rectangular configuration and including a rectangular projection which abuts the panel when the molding is removably attached to the front face of the associated framework. In this manner, the panel is permitted to float relative to the framework seat and molding so as to prevent cracking of the panel.

The framework preferably includes two pairs of substantially parallel rails, each of the pairs of rails being arranged substantially perpendicular to the other of the pairs of rails and connected together by a fastener disposed engaging abutting ones of the rails for attaching same to one another in a rigid manner.

A fastener according to the invention preferably comprises an elongated element including a pair of spaced, substantially parallel legs and a web connecting together the legs such that the element has a cross section substantially in the form of an H, with each of the legs of the element extending equidistant in opposite directions from the web and being insertable into respective ones of adjacent rails to be connected together so as to prevent movement of the rails away from one another.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view showing a cabinet door constructed in accordance with the present invention.

FIG. 2 is a front elevational view showing the door of FIG. 1.

FIG. 3 is an enlarged, fragmentary, sectional view taken generally along the line 3—3 of FIG. 2.

DESCRIPTION OF THE PREFERRED EMBODIMENTS

Figure 4:
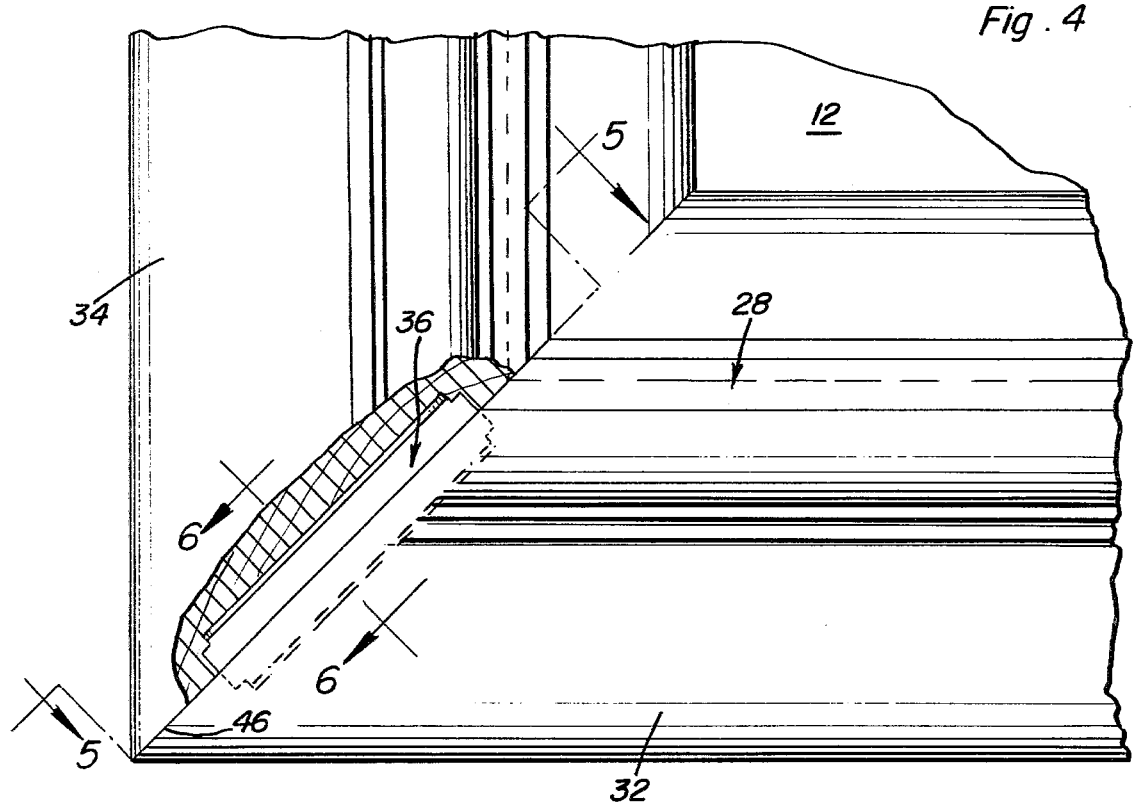
FIG. 4 is an enlarged, fragmentary, front elevational view, showing the lower left hand portion of FIG. 2, and partly cut away and in section to show more clearly the manner in which abutting rails of the cabinet door are fastened to one another in accordance with the present invention.

Referring now more particularly to FIGS. 1 through 3 of the drawings, a cabinet door 10 constructed in accordance with the present invention includes a panel 12 disposed blocking an opening 14 of a substantially rectangular framework 16 including a rectangular seat 18 for floatingly receiving panel 12. A retainer 20 is removably mounted on framework 16 for holding panel 12 in seat 18 in such a manner as to permit panel 12 to move relative to framework 16 and prevent panel 12 from cracking as the panel 12 expands or contracts under the influence of varying humidity conditions, and the like.

Framework 16, as mentioned above, preferably has a substantially rectangular configuration with opening 14 also being rectangular together with panel 12. The latter is slightly smaller in size than opening 14 to allow for expansion of panel 12 after assembly of cabinet door 10, with framework 16 having a front face 22 and a rear face 24. Seat 18 of frame 16 includes a ledge 26 which extends into opening 14 from adjacent the rear face 24 of framework 16 so as to permit panel 12 to be placed onto and removed from seat 18 from adjacent the front face 22 of framework 16.

Retainer 20 includes a molding 28 of substantially rectangular configuration and smaller size than framework 16 so as to overlap with the dimensions of opening 14. This molding 28 is provided with a projection 30, also of rectangular configuration, which extends into opening 14 a distance sufficient for projection 30 to abut against the adjacent peripheral portion of panel 12. By this arrangement, it will be appreciated that panel 12 will be retained between projection 30 and ledge 26 in such a manner as to prevent rattling of panel 12 relative to framework 16 while still permitting expansion and contraction of panel 12 relative to framework 16 and molding 28.

Figure 5:
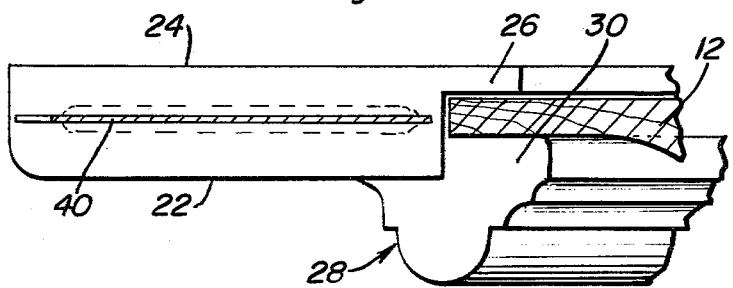
FIG. 5 is an enlarged, fragmentary, sectional view taken generally along the line 5—5 of FIG. 4.
Figure 6:
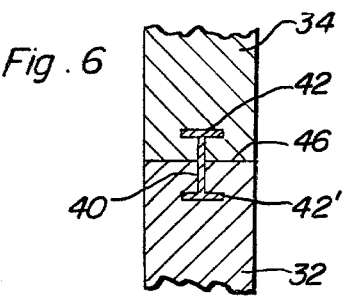
FIG. 6 is an enlarged, fragmentary, sectional view taken generally along the line 6—6 of FIG. 4.

Referring now more particularly to FIGS. 4 through 6 of the drawings, it will be seen that framework 16 comprises two pairs of substantially parallel rails 32 and 34, each of the pairs of rails 32, 34 being arranged substantially perpendicular to the other of the pairs of rails 34, 32 in order to form a generally rectangular framework 16. Each of the ends of the generally longitudinally extending rails 32, 34 has a bevelled edge in order to cooperate with an abutting end of an adjacent one of the rails 32, 34 to form a mitered corner held together with a fastener 36 in such a manner as to provide a rigid attachment of the rails 32, 34 to one another.

Figure 7:
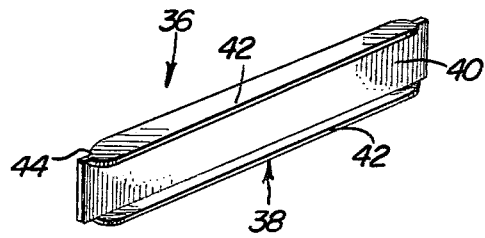
FIG. 7 is a perspective view showing a framework fastening element according to the present invention for fastening together abutting rails of a cabinet door frame.

Fastener 36 is formed by an elongated element 38 including a web 40 arranged connected together a pair of spaced, substantially parallel legs 42 disposed in planes perpendicular to a plane of web 40 and extending equidistant in opposite directions from the plane of web 40. Each of the legs 42 terminates in a point 44 which is slightly within the longitudinal extent of the planar web 40, as can best be seen from FIG. 7 of the drawings.

Fasteners 36 are installed at each mitered corner of framework 16 so as to bridge the joints 46 of such mitered corners. That is, element 38 is extended longitudinally from within the inside of the corner, or from within opening 14, from a position just above ledge 26 such that one of the legs 42 is associated with an end of a respective rail 32, 34 in order to retain such rail 32, 34 from movement away from the abutting rail 34, 32. Element 38 is driven into the adjacent rails 32, 34 to be connected together in a suitable manner, such as by a hammer, press, and the like, none of which are shown in the drawings.

Once framework 16 is assembled by use of fasteners 36, an appropriate panel 12 can be inserted into the seat 18 formed by ledge 26 and retained therein by placement of molding 28, as by nails and similar fasteners engaging that portion of framework 16 adjacent to opening 14, in such a manner as to permit expansion and contraction of the panel 12. As can be appreciated, the cabinet door construction according to the present invention permits panel 12 and the associated decorative molding 28 to be applied to framework 16 from the front face 22 thereof in a simple and economical manner, yet without sacrificing rigidity of the resulting door.

As can be readily understood from the above description and from the drawings, a cabinet door constructed in accordance with the present invention provides great flexibility for completely changing the design of the door, while utilizing the same basic frame assembly, but merely changing the center panel and/or applied molding which retains the panel in place.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A cabinet door comprising a panel, a framework including a seat for floatingly receiving the panel, retainer means removably mounted on the framework for holding the panel in the seat of the framework, said framework defining a center opening, said panel being disposed in a position blocking the opening, with the framework and opening both having substantially rectangular configurations, and the panel also having a rectangular configuration and being slightly smaller in size than the opening, said framework having a front face and a rear face, the seat of the framework including a forwardly facing ledge extending into the opening rearward of the front face of the framework for permitting the panel to be inserted into the opening from adjacent the front face of the framework, said retainer means including a molding of substantially rectangular configuration and including a rectangular projection, the molding being removably attached to the front face of the framework, with the projection abutting the panel, said panel being permitted to float relative to the framework seat and the molding, said framework including two pairs of substantially parallel rails, each pair of rails being arranged substantially perpendicular to the other pair of rails, and connector means attaching adjacent rail ends together, the connector means comprising an elongated element including a pair of spaced substantially parallel legs and a web connecting together the legs, each of the legs extending equidistant in opposite directions from the web.

2. The combination of claim 1 wherein said rails include inner and outer side edges, one end of said element being lengthwise inserted into said end rail ends from said inner edges with said element extending transversely of adjacent rail ends along the interface between the end faces thereof and the opposite longitudinal edges of the legs biting into said rail ends and the transverse extent of said web extending between said legs bridging said interface.

3. The combination of claim 2 wherein one pair of longitudinal ends of said legs terminate at points spaced inwardly of the corresponding end of said web.

4. A cabinet door comprising a panel, a framework including a seat for floatingly receiving the panel, retainer means removably mounted on the framework for holding the panel in the seat of the framework, the framework including a plurality of rails and connector means for rigidly fastening together the rails, the connector means comprising an elongated element including a pair of spaced, substantially parallel legs and a web connecting together the legs.

5. A fastener for connecting together mitered corner members, the fastener comprising an elongated fastener element, said element including a pair of spaced, substantially parallel planar legs and a planar web connecting together the legs, the plane of the web being substantially perpendicular to the planes of the legs, with each of the legs extending in opposite directions from the web.

6. A structure as defined in claim 5, in combination with a pair of abutting members having bevelled abutting surfaces forming a mitered corner.

* * * * *